United States Patent
Wyse

(10) Patent No.: US 6,854,315 B2
(45) Date of Patent: Feb. 15, 2005

(54) QUADRATURE COMPENSATION TECHNIQUE FOR VIBRATING GYROSCOPES

(75) Inventor: Stanley F. Wyse, Encino, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 122 days.

(21) Appl. No.: 10/127,165

(22) Filed: Apr. 22, 2002

(65) Prior Publication Data

US 2003/0196475 A1 Oct. 23, 2003

(51) Int. Cl.$^7$ .......................... G01P 21/00; G01C 25/00
(52) U.S. Cl. ............................................................ 73/1.38
(58) Field of Search ............................. 73/1.37–1.38, 73/1.77

(56) References Cited

U.S. PATENT DOCUMENTS

| | | | | |
|---|---|---|---|---|
| 5,522,249 A | * | 6/1996 | Macy | 73/1.37 |
| 5,712,427 A | * | 1/1998 | Matthews | 73/1.37 X |
| 5,955,668 A | * | 9/1999 | Hsu et al. | 73/1.37 X |
| 5,987,986 A | * | 11/1999 | Wyse et al. | 73/504.12 |
| 6,067,858 A | | 5/2000 | Clark et al. | 73/504.16 |
| 6,089,089 A | * | 7/2000 | Hsu | 73/1.77 X |
| 6,370,937 B2 | * | 4/2002 | Hsu | 73/1.37 |
| 6,595,056 B2 | * | 7/2003 | Stewart | 73/514.29 |
| 6,619,121 B1 | * | 9/2003 | Stewart et al. | 73/504.02 |
| 6,629,460 B2 | * | 10/2003 | Challoner | 73/504.02 |
| 6,651,500 B2 | * | 11/2003 | Stewart et al. | 73/511 |
| 2003/0101792 A1 | * | 6/2003 | Kubens et al. | 73/1.41 |

FOREIGN PATENT DOCUMENTS

| | | | | |
|---|---|---|---|---|
| WO | WO 00/57194 | * | 9/2000 | G01P/9/04 |
| WO | WO 01/71364A 1 | | 9/2001 | G01P/9/04 |
| WO | WO 01/14831 A1 | | 3/2002 | G01C/19/56 |

OTHER PUBLICATIONS

Derwent–Acc–No 1976–E1359X Abstract of SU 463912 A "Correction factor of pendulous accelerometer scale—determined by measuring signals in two opposite positions" Bazhenov, Sep. 1975.*
U.S. Appl. No. 60/190,271.*

* cited by examiner

Primary Examiner—Thomas P. Noland

(57) ABSTRACT

Quadrature error occurs in vibrating gyroscopes because of manufacturing flaws that permit the sensing element (proof mass) to oscillate about an axis that is not orthogonal to the output axis. This creates an oscillation about the output axis that has a component of the sensing element's vibration acceleration. This output axis oscillation, which is in phase with the driven acceleration of the sensing element, is called quadrature torque since it is ninety degrees out of phase with the angular rate induced acceleration. In order to eliminate this output axis oscillation, the present invention generates sinusoidal forces on the dither mass by applying dc voltages on the dither mass pickoff electrodes. These forces create a counter dither motion about the output axis that cancels the output axis oscillation generated by the non-orthogonal dither axis.

9 Claims, 2 Drawing Sheets

QUADRATURE COMPENSATION TECHNIQUE FOR VIBRATING GYROSCOPES

BACKGROUND OF THE INVENTION

1. Field of the Invention

The present invention relates to an inertial instrument, and more specifically pertains to vibrating gyroscopes.

2. Description of the Prior Art

Gyroscopes are well known for use as sensors for sensing angular velocity acceleration which information is necessary for determining the location, direction, position, and velocity of moving vehicles, for example. Vibrating gyroscopes, while providing advantages in size and cost, have exhibited quadrature torque generated in the gyroscope output axis, apparently because the dither drive for such vibrating gyroscopes couples energy into the output axis as a result of the non-orthogonality between the dither axis and the output axis. This angular acceleration torque on the output axis is according to current techniques accommodated by a closed-loop torque-to-balance servo loop by applying torque directly on the proof mass to cancel this torque. This torque has a 90 degree phase relationship relative to the signal created by rate inputs and is therefore called "quadrature torque". As a result, the rate signal can be extracted by phase discrimination techniques. However, if the quadrature torque is large, as sometimes occurs, a small error in the phase of the feedback torque, at the dither frequency, will generate a substantial error in the rate measurement.

To overcome this problem of phase error, prior art techniques have been recommending the use of dc voltages on the electrodes of the proof mass, which in turn generate an alternating torque on the proof mass during each cycle of dither motion. Although this technique works well, the present invention takes an alternate simpler, and perhaps, a more elegant approach, to solving the problem.

SUMMARY OF THE INVENTION

The present invention utilizes two masses in tandem, a dither mass and a proof mass, or sensor paddle. Each mass has only a single degree of freedom. It is desired to have the dither mass rotate about an axis Z that is perpendicular to the plane of its housing. The normal driving forces on the dither mass causing its vibration do not act directly on the proof mass. Due to manufacturing tolerances, the dither mass tends to actually rotate about an axis that is at an angle γ to the desired dither axis Z. This off-axis dither motion generates error signals at the output axis which are in quadrature with the signals generated by rate inputs. The present invention applies vibration driving signals to the dither mass to vibrate the dither mass and proof mass at a combined resonant frequency, and in addition applies sinusoidal forces to the dither mass by applying dc voltages to the dither mass pickoff electrodes. These sinusoidal forces create an additional dither motion about the output axis Y that cancels the quadrature torque caused by the dither axis misalignment angle γ.

BRIEF DESCRIPTION OF THE DRAWINGS

The exact nature of this invention, as well as its objects and advantages will become readily apparent from consideration of the following specification in relation to the accompanying drawings in which like reference numerals designate like parts throughout the figures thereof and wherein.

DESCRIPTION OF THE PREFERRED EMBODIMENTS

The construction of various forms of vibrating gyroscopes produced from silicon wafers is well known. U.S. Pat. No. 5,987,986 granted Nov. 23, 1999 to Stanley F. Wyse, Robert E. Stewart, and Samuel H. Fersht for Navigation Grade Micromachined Rotation Sensor System, and assigned to the same assignee as the present application, is one example. The entire disclosure of U.S. Pat. No. 5,987,986 is incorporated herein by reference as if fully set forth hereat.

Various techniques of nulling the quadrature error that is created in such gyroscope structures have been tried. One such technique is shown and described in an article entitled *Surface Micromachined Z-Axis Vibratory Rate Gyroscope* by William A. Clark, Roger T. Howe, and Roberto Horowitz presented at a Solid-State Sensor and Actuator Workshop in Hilton Head, S.C. on Jun. 2–6, 1996.

Figure 1:
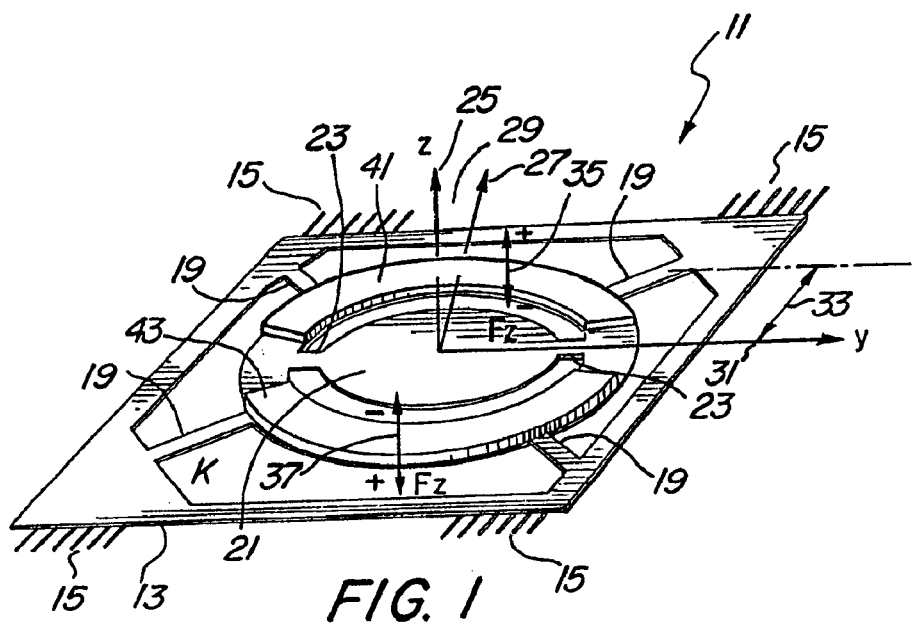
FIG. 1 is a perspective view in schematic form of the driven and sensing element of a gyroscope and the quadrature driving electrodes according to the present invention.
Figure 3:
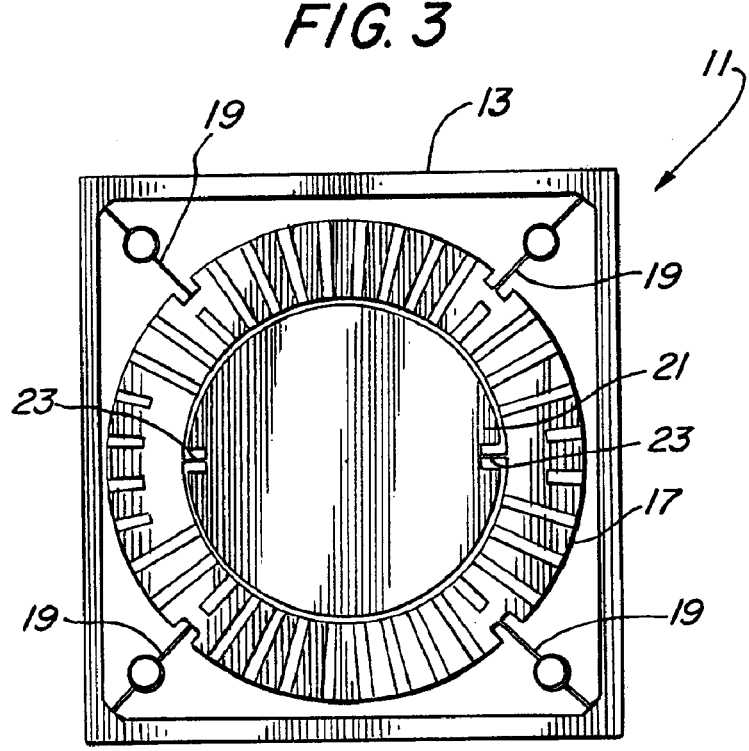
FIG. 3 is a plan view of the driven and sensing element of a gyroscope according to the present invention.

The technique proposed in the present application is different and is best illustrated by reference to FIGS. 1, 3 and 4 which shows in schematic form the basic elements of a vibrating gyroscope 11 having a frame 13 that is fixedly attached by convenient means 15 to a moving platform, for example. Within frame 13, a dither driven mass 17 is suspended by flexure beams 19 which are designed to flex about a Z axis 25. Each flexure beam 19 has a certain axial stiffness factor K in the Z direction. Mounted within dither driven mass 17 is a proof mass 21 which is attached to the dither driven mass 17 by flexure beams 23. Flexure beams 23 allow the proof mass 21 to rotate about the Y output axis 31. The dither mass and proof mass combination is the dither mass structure.

A pair of semi-circular electrodes 41, 43, preferably located in the cover (not shown) for the vibrating gyroscope 11, are the pickoff electrodes for measuring the vibration amplitude of the dither mass 17. These pick off electrodes also act as the quadrature compensating electrodes by generating a torque on the dither driven mass 17 at the dither frequency, but uses dc voltages on these electrodes to create an ac torque about Y axis 31.

Theoretically, rotational motion of the dither mass structure would be about the Z axis 25. In reality, because of manufacturing tolerances, solid state vibrating gyroscopes experience Z axis misalignment 29 by an angle γ which causes dither motion to be about a dither axis 27 that is misaligned. This dither misalignment 29 by angle γ causes motion about Y output axis 31 thereby creating a quadrature error. Dither driven mass 17 causes the dither mass structure to rotate about misaligned axis 27. The dc voltage on pick off electrodes 41, 43 causes the dither mass structure to also rotate about Y output axis 31 in a manner that cancels the Y-axis dither component, or quadrature error, due to the γ angle misalignment 29.

Figure 4:
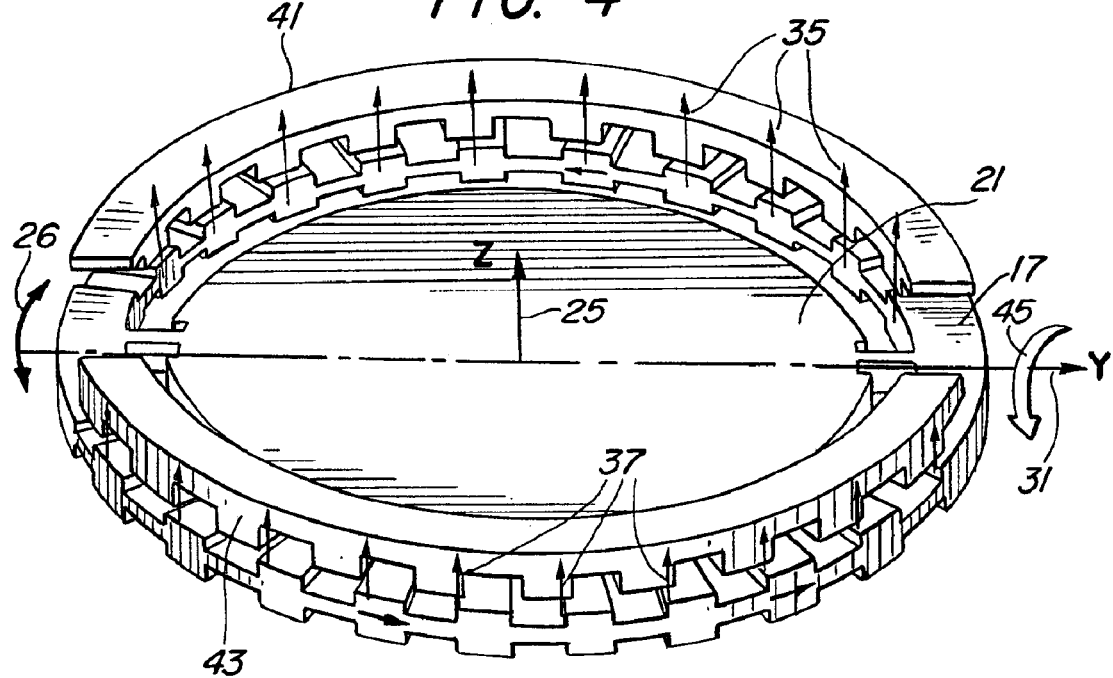
FIG. 4 is a perspective illustration showing the location of the quadrature electrode on the dither mass.

With reference to FIG. 4, assume the dither mass structure is momentarily rotating about Z axis 25 in the direction 26. The pick off electrodes 41 generate strong forces 35 on dither mass 17 along Z dither axis 25 because the teeth are directly opposite one another. The pick off electrodes 43 generate weak forces 37 along Z dither axis 25 because the teeth are in between each other. The net effect of these forces about the Y output axis 31 produces a torque 45. When the dither mass structure is moving in the other direction, all these forces reverse, and the torque 45 about the Y axis 31 is in the opposite direction. By adjusting the dc voltages on pickoff electrodes 41, 43, these torques will cancel the quadrature torque caused by the Y axis dither component from the γ angle misalignment.

For a specific solid state vibrating gyroscope, the parameters may be as follows:

For axial motion along the Z dither axis 25:

m(total dithered mass)=0.1 gm

K is beam stiffness in Z direction $f_z$=6000 Hz $\omega_z=\sqrt{(4K/m)}=2\pi \times 6000$ $K=3.55\times 10^7$ dn/cm The parameters for angular motion about the Y output axis 31 is as follows:

$I_{Dy}$ (dithered inertia about the Y axis)=0.006 gm-cm$^2$ r (peak lever arm)=0.45 cm $K_\theta=4Kr^2=2.9\times 10_7$ dn-cm/rad $\omega_y=\sqrt{(K_\theta/I_{Dy})}$=69500 r/sec=11.1 KH For a dither misalignment γ=0.01 radians, one would need to drive the dithered inertia $I_{Dy}$ about the Y output axis 31 at 25 microradians which is 1% of the 2.5 milliradians of dither amplitude. This would require $(25\times 10^6)(2.9\times 10^7)$= 725 peak dn-cm of torque.

Each dither pickoff electrode 41, 43 generates about 0.14 dn/volt$^2$ of Z axis force when the poles are aligned. The mean r lever arm 33 (FIG. 1) for torque about Y in this example is about 2.5 mm. As a result, 145 dc volts would be required on the two pickoff electrodes 41, 43, which could be located in the top or bottom covers, to generate the required 725 dn-cm of peak ac torque needed to cancel the generated quadrature output about Y output axis 31.

Figure 2:
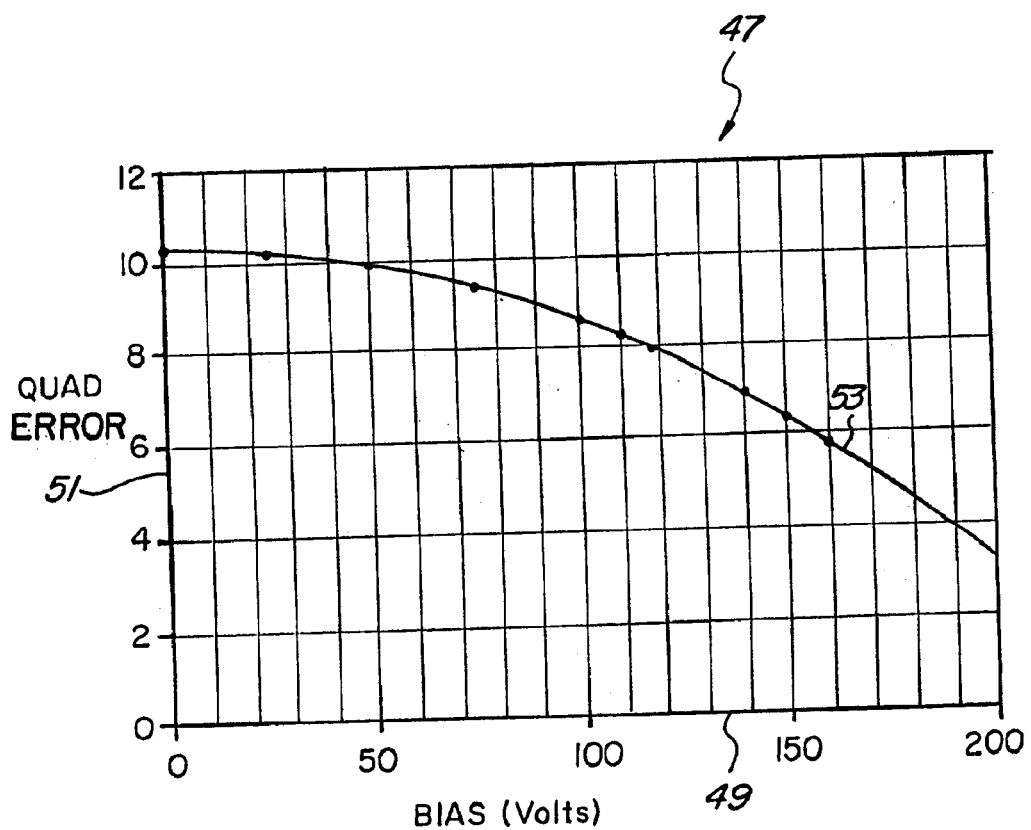
FIG. 2 is a graph showing the effect of the invention on quadrature error.

Actual tests were conducted to show the effect of applying dc bias volts, as discussed above, on the pickoff electrodes to determine their effect in quadrature correction. The results are shown in FIG. 2, graph 47, which plots the bias volts applied to the pickoff electrodes on the horizontal axis 49 versus the quadrature error voltage along the vertical axis 31. The resultant curve 53 illustrates that as the bias volts are increased in maximum amplitude, the quadrature error voltage drops significantly. Thus, at around 150 peak dc volts, the quadrature error has dropped almost by half.

This invention serves to keep the quadrature error on the output axis of vibrating gyroscopes at a very low or null level.

What is claimed is:

1. An apparatus for nulling quadrature in a vibrating gyroscope having a dither mass and a proof mass, the apparatus comprising:

the dither mass mounted for movement about a dither axis Z;

the proof mass mounted to the dither mass for movement with the dither mass and for movement about an output axis Y, the dither mass movement causing oscillation about output axis Y that creates quadrature error; and a source of sinusoidal force applied to the dither mass for moving the dither mass in a manner that cancels the quadrature error.

2. The apparatus of claim 1 wherein the source of sinusoidal force comprises dc voltages.

3. The apparatus of claim 2 wherein the dc voltages comprise plus or minus dc voltages, each applied to electrodes close to the dither mass.

4. The method of claim 2 wherein the plus or minus dc voltage is applied to electrodes at the top or bottom sides of the dither mass.

5. An apparatus for compensating for the quadrature error in a vibrating gyroscope, comprising:

a dither mass flexurally mounted within a frame for vibration;

a proof mass mounted to said dither mass by a flexure for oscillating at a predetermined frequency; and a source of sinusoidal force applied to the dither mass for causing movement that reduces or cancels the quadrature error.

6. The apparatus of claim 5 wherein the source of sinusoidal force comprises plus or minus dc voltages.

7. The apparatus of claim 6 further comprising electrodes adjacent to the dither mass.

8. The apparatus of claim 7 wherein the plus or minus dc voltages are applied to the electrodes.

9. The apparatus of claim 8 wherein the electrodes also create dither mass vibration.

* * * * *